United States Patent [19]

Leibhard

[11] Patent Number: 4,564,324

[45] Date of Patent: Jan. 14, 1986

[54] DOWEL

[75] Inventor: Erich Leibhard, Munich, Fed. Rep. of Germany

[73] Assignee: Hilti Aktiengesellschaft, Fürstentum, Liechtenstein

[21] Appl. No.: 419,421

[22] Filed: Sep. 17, 1982

Related U.S. Application Data

[63] Continuation-in-part of Ser. No. 370,483, Apr. 21, 1982, abandoned.

[30] Foreign Application Priority Data

Apr. 24, 1981 [DE]  Fed. Rep. of Germany ....... 3116424

[51] Int. Cl.$^4$ ............................................. F16B 39/02
[52] U.S. Cl. .......................................... 411/3; 411/42; 411/44; 411/55; 428/546; 428/549
[58] Field of Search .................. 411/39, 42, 44, 55, 411/57, 60, 1-5; 428/546, 549

[56] References Cited

U.S. PATENT DOCUMENTS

| | | |
|---|---|---|
| 626,040 | 5/1899 | Rowlands ............................... 411/54 |
| 699,245 | 5/1902 | Russell .................................. 411/61 |
| 1,052,830 | 2/1913 | Kennedy ................................ 411/55 |
| 2,110,053 | 3/1938 | Phillips .................................. 411/44 |
| 2,393,323 | 1/1946 | Hungerford et al. ............ 428/546 X |
| 2,672,175 | 3/1954 | Howard ............................. 411/54 X |
| 2,760,399 | 8/1956 | Rea ......................................... 411/57 |
| 3,796,125 | 3/1974 | Campbell et al. ........................ 411/2 |
| 4,035,159 | 7/1977 | Hashimoto et al. ............. 428/546 X |
| 4,112,637 | 9/1978 | Herbst ................................ 411/57 X |

FOREIGN PATENT DOCUMENTS

| | | | |
|---|---|---|---|
| 162190 | 1/1949 | Austria ................................... 411/60 |
| 6093869 | 7/1981 | Japan .................................... 428/546 |
| 478025 | 1/1938 | United Kingdom ................ 428/546 |
| 1089586 | 11/1967 | United Kingdom .................. 411/61 |
| 2095355 | 9/1982 | United Kingdom .................. 411/39 |

Primary Examiner—Kenneth J. Dorner
Assistant Examiner—Lloyd A. Gall
Attorney, Agent, or Firm—Toren, McGeady, Stanger, Goldberg & Kiel

[57]  ABSTRACT

A dowel for insertion into a borehole in a structural unit includes a dowel body and a spreading member. The dowel body is axially elongated and has a cylindrically shaped outside surface with a bore extending axially through the body. The body is formed of a sintered dry powdered metal made up primarily of iron and having a weight in the range of 5 to 7 g/cm$^3$. Phosphorus in the range of 0.1 to 1% can be added to the dry powdered material to increase its cohesion. Further, the sintered material can be reinforced with fibers. An axially extending portion of the bore is conically shaped and the spreading member is similarly conically shaped for radially expanding the dowel body within the borehole.

10 Claims, 3 Drawing Figures

U.S. Patent  Jan. 14, 1986  4,564,324
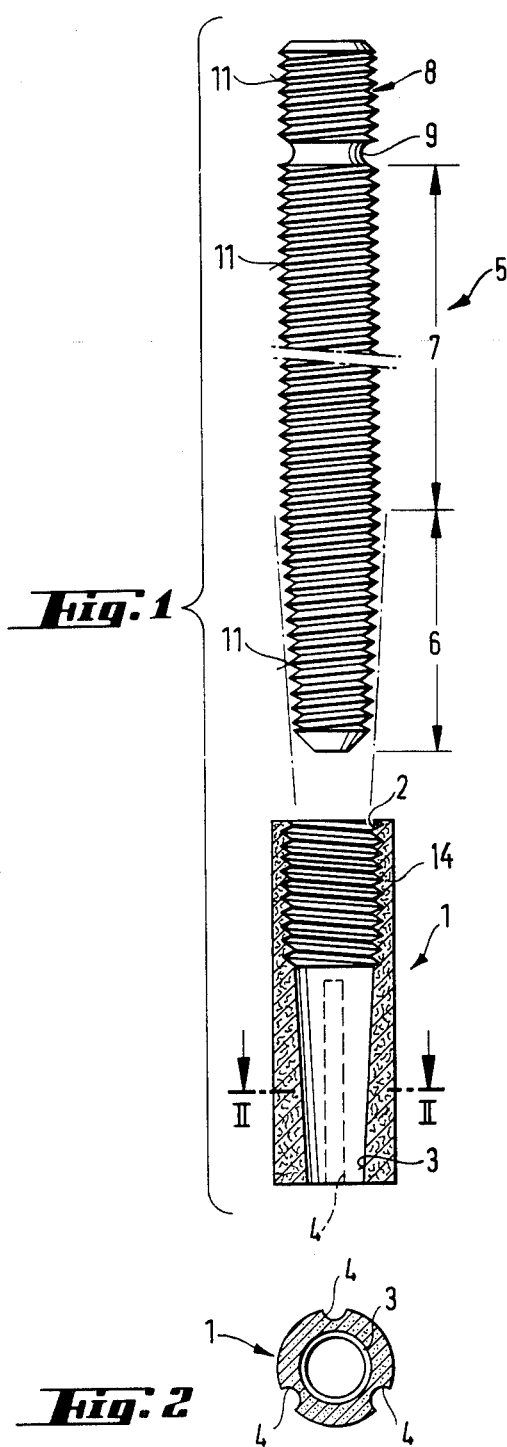
Fig. 1
Fig. 2
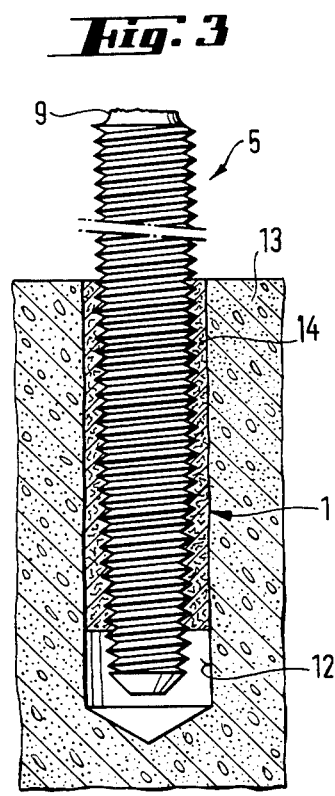
Fig. 3

DOWEL

CROSS-REFERENCE TO RELATED APPLICATION

This application is a continuation-in-part of application Ser. No. 370,483 filed on Apr. 21, 1982 now abandoned.

SUMMARY OF THE INVENTION

The present invention is directed to a dowel consisting of a cylindrically shaped dowel body formed of a sintered material and a conically shaped spreading element. The dowel body has an axially extending bore with a conically shaped portion.

A known dowel unit consists of a multi-part cylindrically shaped dowel body with a bore having a conically shaped surface diverging in the insertion direction of the dowel into a borehole. The dowel includes a conically shaped spreading element insertable into the bore so that it can be pulled through the bore in the direction out of the borehole. The dowel body is formed of a plastics material, such as a polyester resin, and it is filled with a mineral material. The dowel body is shaped by sintering.

To anchor the dowel in a borehole formed in a structural unit, the spreading element is pulled through the dowel body in the direction out of the borehole. During the expanding procedure, initially the dowel body is transformed into a powdery state and as the withdrawal of the spreading element continues the material is compressed into a compact body. During the expanding step, the dowel body is pressed outwardly against the surface of the borehole and any irregular surfaces in the borehole develop a form-locking hold between the dowel body and the structural unit.

The main disadvantages of this known dowel are its relatively small anchoring value, inadequate anchoring when the spreading element is not completely retracted, the complicated construction of the dowel body and the consequent handling difficulties during the expanding step.

The primary object of the present invention is to provide a dowel which adapts to the irregular surfaces of the borehole into which it is inserted, and is distinguished by high and secure anchoring values as well as by its simplicity.

In accordance with the present invention, the sintered material of the dowel body is a dry powdered metal consisting primarily of iron and having a specific weight of 5 to 7 g/cm$^3$.

A dowel body of dry powdered metal with the above-mentioned density has the appropriate inherent strength so that high and secure anchoring values can be achieved, especially by affording a form-locking engagement of the dowel body into the uneven surfaces within a borehole. The sintered material is notable by sufficient elasticity and cohesion so that the material is not transformed into the powdered state during the expanding process. Accordingly, even if the dowel is only partially spread, the anchoring values, though smaller, are reliable.

The spreading element is formed of steel which has the required physical properties.

To improve the cohesion of the dry powdered material, phosphorus is added in the range of 0.1 to 1%. In this way, all the mechanical properties, such as tenacity and elasticity, important for a good anchoring characteristic are positively influenced. Moreover, a uniform arrangement and distribution of the interstices of the dry powdered metal can be attained in the initial state of the dowel body and contributes to the preferred anchoring behavior of the dowel.

When the dowel is used in a very high strength structural unit, it has been shown that the anchoring values are limited by the strength of the dowel body. Accordingly, a higher strength dowel body would be advantageous. The higher density connected with higher strength, however, makes the insertion of the spreading element into the dowel and the formation of the thread in the dowel body more difficult. To attain optimum material properties for fulfilling these functional requirements, preferably, the dry powdered material is reinforced with fibers. The fibers in such a composite material are oriented basically in the axial direction of the dowel body. In such a fiber reinforced dowel body, metal fibers, oxide fibers, carbide fibers, nitrite fibers or carbon fibers would be suitable.

In accordance with the present invention, the dry powdered material can be strengthened using a corrosion inhibiting material. Such material acts in the interior of the dowel body in its original state as well as in the anchored state with respect to the spreading element, and also as a protective film for the outer surface of the dowel body. Metals such as zinc or plastic prepolymers are suitable corrosion inhibiting materials. Advantageously, the corrosion inhibiting materials are applied in the liquid state into the interstices of the dowel body such as by soaking the dowel body.

To afford a safe and simple process for anchoring the dowel body, it is preferable if the spreading element and the conical bore in the dowel body narrow toward its leading end, that is the end first inserted into the borehole. Therefore, the anchoring pressure developed relative to the surface of the borehole always acts at least in the interior of the borehole, that is, in a region of the structural unit capable of absorbing the anchoring force.

The displacement of the spreading element in the dowel body can be effected by rotating the spreading element and/or by driving the spreading element into the bore in the dowel body. For moving the spreading element into the dowel body it is advantageous to clamp the spreading element into an appropriate powered driving unit.

Another feature of the present invention is the provision of the conical spreading part of the spreading element with a thread for improving the connection between the dowel body and the spreading element. The spreading element is moved forwardly into the dowel body by rotating the spreading element and by applying an axially directed force to the element from the outside. The threaded part of the spreading element creates a corresponding counterthread in the dowel body so that a form locking connection is provided between the two components. The threaded connection permits the spreading element to be detached or withdrawn from the dowel body at any time.

If the bore in the dowel body is threaded originally, then it is only necessary to impart a rotary motion to the spreading element. Under such rotary motion, the spreading element moves into the dowel body automatically into the spread or expanded position due to the engagement between the threads on the spreading element and in the dowel body.

To achieve a good spreading effect, the conical angle of the spreading element is in the range of 6° to 12° and preferably 10°, while the conical angle within the bore in the dowel body is 4° to 7°, and preferably 6°. Using such a cone angle arrangement of the spreading element and the bore, it is possible to assure that too much resistance is not developed by the movement of the spreading element into the bore and also to afford adequate expansion of the dowel body. At the completion of the expansion of the dowel body, at least in the region originally defined by the conical bore, homogeneous distribution of the material is obtained, as in the case of a compact metal.

The ability of the dowel body to expand is favorably influenced, that is high spreading forces are not required, if the dowel body is provided with axially extending parts of reduced strength in its cross sectional area, such as in the form of grooves or notches. Using such a construction, predetermined breaking regions are created which, when a predetermined spreading force is applied, causes a controlled separation of the dowel body.

Another advantageous feature of the invention, particularly with regard to its safety, is the visible indication provided when a predetermined anchoring force has been reached. Accordingly, the end of the spreading element spaced axially from the end which effects the spreading action is provided with means for rotating the element. Between such means on the spreading element and the axially extending remainder, a section of reduced diameter is provided so that the engagement means can be separated from the rest of the spreading element when a predetermined torque has been applied. The force for rotating the spreading element into the dowel body is transferred from a driving device, for instance a drill, to the engagement means. As the spreading element is driven into the dowel body, the applied torque increases due to the spreading force required. Toward the end of the spreading process, the applied torque exceeds a predetermined maximum value transferrable through the reduced strength region of the element and the engagement means separates from the remainder of the spreading element. In this way a required anchoring value is attained which is determined by external force influences.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view of the parts of a dowel embodying the present invention and shown separated from one another with the dowel body shown in section;

FIG. 2 is a sectional view taken along the line II—II in FIG. 1; and

FIG. 3 is a sectional view showing the dowel secured within a structural unit.

DETAIL DESCRIPTION OF THE INVENTION

As shown in FIG. 1, the dowel includes a cylindrical dowel body 1 with an axially extending bore and the dowel body is made of a sintered, fiber-reinforced 14, dry powdered metal with a specific weight of 5 to 7 g/cm$^3$. As viewed in FIG. 1 the lower end of the dowel body 1 is its leading end, that is the end which is first inserted into a borehole 12 formed in a structural unit 13, such as illustrated in FIG. 3. The opposite end of the dowel body is its trailing end. The bore, as shown, extends from the leading end to the trailing end. From the trailing end, a thread 2 is formed in the bore of the dowel body 1 up to the trailing end of a conical section 3 which converges toward the leading end of the body. Axially extending grooves 4 are located in the outer surface of the dowel body within the axially extending region of the conical section 3. As can be seen in FIG. 2, the grooves 4 are spaced angularly apart and provide axially extending predetermined breaking regions in the dowel body.

A spreading element 5 anchors the dowel body when it is driven forwardly into the dowel body bore from the trailing end toward the leading end. As shown in FIG. 1, the leading end of the spreading element is its lower end and the trailing end is its upper end. Starting at the leading end of the spreading element 5 it has an axially extending conical spreading region 6 followed by an axially extending cylindrical region or section 7. The trailing end of the spreading element is an engagement member or section 8 joined to the trailing end of the cylindrical section 7 with an annular groove 9 in the outer surface of the spreading element 5 separating the two sections and affording a reduced cross sectional area or region of reduced strength. A thread 11 extends from the leading end to the trailing end of the spreading element 5, traversing the conical spreading region 6, the cylindrical region 7, and the engagement member 8.

To anchor the dowel body 1 in a borehole 12 of a structural unit 13, the body is first inserted into the borehole and then the spreading element is driven forwardly into the bore in the dowel body by applying rotary motion. The rotary motion can be transmitted from a drill, not shown, to the engagement member 8.

As the spreading element 5 is driven forwardly through the bore in the drill body 1, the material in the conical section 3 is displaced radially outwardly starting at the end adjoining the thread 2. Because of its advantageous character, the material forming the dowel body adapts to any uneven surface within the borehole 12. Furthermore, as the dowel body 1 is spread or expanded radially outwardly, the spreading element 5 forms a counterthread in the inside surface of the conical section 3 so that the spreading element is held in a form-locking manner over the entire length of the dowel body when it reaches the position shown in FIG. 3. When the torque applied to the spreading element 5 exceeds the torque which the groove 9 is capable of withstanding, the engagement member 8 separates from the rest of the spreading element 5 signalling that a predetermined holding or anchoring value has been achieved.

While a portion of the bore through the dowel body 1 is shown threaded, it is possible to omit the thread 2 and to achieve a very effective anchor when the diameter of the bore in the dowel body 1 and the spreading element 5 correspond to one another, and the spreading element itself may be provided with or without a thread 11. In such an arrangement, both rotary and percussive motion are imparted to the spreading element to drive it into and through the bore in the dowel body 1.

While specific embodiments of the invention have been shown and described in detail to illustrate the application of the inventive principles, it will be understood that the invention may be embodied otherwise without departing from such principles.

I claim:

1. An anchor dowel comprising an axially elongated dowel body having a cylindrically shaped outside surface and an axially extending bore, said dowel body having a leading end and a trailing end spaced apart in the axial direction with said bore extending from the leading end to the trailing end, at least an axially extending section of said bore being conically shaped from the leading end toward the trailing end with the conically shaped section diverging in the direction from the leading end toward the trailing end, and an axially elongated spreading element having a leading end and a trailing end spaced apart in the axial direction and including at least an axially extending conically shaped portion extending from the leading end toward the trailing end, and said spreading element arranged to be inserted into the bore for spreading said dowel body radially outwardly, wherein said dowel body is formed of a sintered dry powdered metal, and said dry powdered metal comprises iron and has a weight in the range of 5 to 7 $g/cm^3$, the outside surface of said dowel body extending axially from the leading end thereof has a plurality of axially extending grooves with the grooves being spaced angularly apart and extending from the leading end of said dowel body for at least a portion of the axial length of said conical section of said dowel body.

2. A dowel, as set forth in claim 1, wherein said dry powdered metal has a phosphorus content in the range of 0.1 to 1%.

3. A dowel, as set forth in claim 1 or 2, wherein said dry powdered metal includes fibers.

4. A dowel, as set forth in claim 3, wherein said fibers extend in the axial direction of said dowel body.

5. A dowel, as set forth in claim 1 or 2, wherein said dry powdered metal includes a corrosion inhibiting material for strengthening said dowel body.

6. A dowel, as set forth in claims 1 or 2, wherein each of said dowel body and said spreading element has a leading end and a trailing end spaced apart in the axial direction thereof, and the conical section in the bore of said dowel body and on said spreading element converges toward the leading end thereof.

7. A dowel, as set forth in claim 6, wherein the conically shaped portion of said spreading element is threaded.

8. A dowel, as set forth in claim 6, wherein the cone angle of the conically shaped portion of said spreading element is in the range of 6° to 12° and the cone angle of the conical section of said bore in said dowel body is in the range of 4 to 7°.

9. A dowel, as set forth in claim 1, wherein said spreading element includes an engagement member extending from the trailing end thereof toward the leading end, an annular groove encircling said spreading element and separating said engagement member from the remainder of said spreading element extending toward the leading end thereof, said engagement member arranged to fit into a driving member for introducing torque to said spreading element, and said annular groove forming a reduced cross sectional area section of said spreading element arranged to effect the separation of said engagement member from the remainder of said spreading element when a predetermined torque is applied to said spreading element.

10. An anchor dowel comprising an axially elongated dowel body having a cylindrically shaped outside surface and an axially extending bore, said dowel body having a leading end and a trailing end spaced apart in the axial direction with said bore extending from the leading end to the trailing end, at least an axially extending section of said bore being conically shaped from the leading end toward the trailing end with the conically shaped section diverging in the direction toward the trailing end, and an axially elongated spreading element having a leading end and a trailing end spaced apart in the axial direction and including at least an axially extending conically shaped portion extending from the leading end toward the trailing end and diverging outwardly toward the trailing end, said spreading element arranged to be inserted into the bore for spreading said dowel body radially outwardly, wherein said dowel body is formed of a sintered dry powdered metal, and said dry powdered metal comprises iron and has a weight in the range of 5 to 7 $g/cm^3$, said dry powdered metal has a phosphorus content in the range of 0.1 to 1% for improving cohesion of the dry powdered material, and said dry powdered material includes fibers extending in the axial direction thereof, the cone angle of the conically shaped portion of said spreading element is in the range of 6° to 12° and the cone angle of the conically shaped section of said dowel body is in the range of 4° to 7°, and the outside surface of said dowel body extending axially from the leading end thereof has a plurality of axially extending grooves with the grooves being spaced angularly apart and extending for at least a portion of the axial length of the conically shaped section of said dowel body.

* * * * *